Patented Aug. 26, 1924.

1,506,198

UNITED STATES PATENT OFFICE.

CARL H. NORDELL, OF FORT WAYNE, INDIANA, ASSIGNOR TO WAYNE TANK AND PUMP COMPANY, OF FORT WAYNE, INDIANA, A CORPORATION OF INDIANA.

STABILIZED GLAUCONITE AND METHOD OF MAKING SAME.

No Drawing.   Application filed January 17, 1924.   Serial No. 686,897.

*To all whom it may concern:*

Be it known that I, CARL H. NORDELL, a citizen of the United States, residing at Fort Wayne, in the county of Allen and State of Indiana, have invented new and useful Improvements in Stabilized Glauconite and Methods of Making Same, of which the following is a specification.

This invention relates to treating the so-called zeolite known as glauconite or greensand so as to better adapt it for use as a water softening agent.

Glauconite is a granular base exchange silicate and as taken from the beds in which it is found deposited may be used for softening water when regenerated. Regeneration is ordinarily effected with common salt brine. Glauconite in its sodium form is ready for use as a water softening material; after it has given up its sodium in exchange for magnesium or calcium it is termed "exhausted." It is customary to first separate the grains from clay and other waste substances by washing. The glauconite grains have a tendency to disintegrate slightly when subjected to the action of soft water, particularly when allowed to stand immersed in such water; and such soft water is produced as the natural result of the softening process.

While this disintegration is generally so slight as to make the loss of glauconite negligible, it is sufficient to color the softened water, and this is very objectionable to users.

The reduction and minimization of this tendency of the glauconite to "throw color" is the principal object of the invention. The method of stabilizing the glauconite so as to accomplish this object, and the product so produced are the subjects of this invention.

The invention consists of treating washed glauconite with sodium silicate in such a way as to form a substantially insoluble silicate of the alkali-earth metals by the natural process of exchange. This insoluble material forms a binder on the exposed surface of the grains of mineral and probably in the pores thereof, and thus prevents the disintegration which causes "color throwing".

I am aware of the fact that sodium silicate has been used to deter the tendency of glauconite to "throw color", but the silication has never been carried on so as to accomplish the results attained by the use of the process described herein. It is not been recognized that the silication should be accomplished in such a manner as to form the greatest amount possible of insoluble silicate on the glauconite grains; nor has it been recognized that the formation of magnesium silicate rather than calcium silicate is preferable.

My invention constitutes a process of depositing a heavy coating of silicates of the alkali-earth metals on the glauconite grains, cheaply and efficiently. The process consists of, first, regenerating the glauconite making it a sodium zeolite; second, thoroughly washing it preferably with hot soft water, the washing to be accompanied by agitation; third, passing a sufficient amount of hard water containing magnesium or calcium, preferably the former, through it, making it a magnesium or calcium zeolite; and, fourth, treat it with a solution of sodium silicate, preferably hot. The amount of sodium silicate used is preferably enough so that the sodium content is sufficient to re-establish through the exercise of its natural base exchange properties the sodium form of the glauconite.

After silication it is only necessary to thoroughly wash the so treated glauconite preferably with hot soft water. It is then ready for use.

I have found that it is preferable not to dry the so treated glauconite, but to ship it moist in drums, from which it is put directly into the water softening apparatus.

I claim as my invention and desire to secure by Letters Patent of the United States:

1. The method of stabilizing glauconite to better adapt it for use in softening water, comprising treating exhausted glauconite with sodium silicate.

2. The method of stabilizing glauconite to better adapt it for use in softening water, comprising treating exhausted glauconite with hot sodium silicate.

3. The method of stabilizing glauconite to better adapt it for use in softening water, comprising treating exhausted glauconite with hot sodium silicate in sufficient quantity and of sufficient strength to substantially re-establish the glauconite in its regenerated or sodium form through the exercise of its natural base exchange properties.

4. The method of stabilizing glauconite to better adapt it for use in softening water, comprising washing exhausted glauconite with hot water while it is being agitated and then treating said glauconite with hot sodium silicate in sufficient quantity and of sufficient strength to substantially re-establish the glauconite in its regenerated or sodium form through the exercise of its natural base exchange properties.

5. The method of stabilizing glauconite to better adapt it for use in softening water, consisting of regenerating the glauconite, then washing it with soft water accompanying the washing by agitation, then passing a sufficient quantity of hard water through it to substantially exhaust its water softening capacity, and then treating it with a solution of sodium silicate in sufficient quantity and of sufficient strength to substantially re-establish the glauconite in its regenerated or sodium state through the exercise of its natural base exchange properties.

6. The method of stabilizing glauconite to better adapt it for use in softening water, consisting of regenerating the glauconite, then washing it with hot soft water, accompanying the washing by agitation, then passing a sufficient quantity of water, hardened by magnesium, through it to substantially exhaust its water softening capacity, then treating it with a hot solution of sodium silicate in sufficient quantity and of sufficient strength to substantially re-establish the glauconite in its regenerated or sodium state through the exercise of its natural base exchange properties, and then washing the so treated glauconite.

7. The method of improving glauconite for use as a water softening zeolite, comprising treating substantially exhausted glauconite with sodium silicate and then keeping said product moist.

8. A water softening zeolite consisting of exhausted glauconite stabilized with sodium silicate to arrest the color throwing tendency of said glauconite.

9. A water softening zeolite consisting of exhausted glauconite stabilized with sodium silicate through the exercise of the natural base exchange properties of said glauconite.

10. A water softening zeolite consisting of glauconite upon the grains of which has been deposited from a solution substantially the heaviest possible coating of an alkali-earth metal silicate.

11. A water softening zeolite consisting of exhausted glauconite stabilized by regenerating with a sodium silicate solution so as to produce an alkali-earth metal silicate coating taken on by the exercise of the natural base exchange properties of said glauconite.

12. A water softening zeolite consisting of glauconite which has been stabilized to arrest its "color throwing" tendency by washing it, then regenerating it, then washing it with hot water, accompanying the washing by agitation, then passing a sufficient quantity of hard water through it to substantially exhaust its water softening capacity, then treating it with a hot solution of sodium silicate in sufficient quantity and of sufficient strength to re-establish the glauconite in substantially its regenerated or sodium state through the exercise of its natural base exchange capacity.

13. A water softening zeolite consisting of glauconite which has been stabilized to arrest its "color throwing" tendency by washing it, then regenerating it, then washing it with hot water, accompanying the washing by agitation, then passing a sufficient quantity of water, hardened by magnesium, through it to substantially exhaust its water softening capacity, then treating it with a hot solution of sodium silicate in sufficient quantity and of sufficient strength to re-establish the glauconite in substantially its regenerated or sodium state through the exercise of its natural base exchange capacity, and then washing the so treated glauconite.

14. A water softening zeolite consisting of glauconite which has been exhausted and then stabilized with sodium silicate through the exercise of the natural base exchange capacity of said glauconite, and kept in a moist state.

In testimony whereof I have hereunto set my hand.

CARL H. NORDELL.